United States Patent [19]

Katayama

[11] Patent Number: 4,572,231
[45] Date of Patent: Feb. 25, 1986

[54] ROTARY PLUG VALVE
[75] Inventor: Yoshio Katayama, Kuwana, Japan
[73] Assignee: Hitachi Metals, Ltd., Japan
[21] Appl. No.: 638,568
[22] Filed: Aug. 7, 1984
[30] Foreign Application Priority Data Aug. 8, 1983 [JP] Japan ................................. 58-143894

[51] Int. Cl.³ ............................................... F16K 5/22
[52] U.S. Cl. ............................. 137/246.15; 251/309; 251/317
[58] Field of Search ............. 137/246, 246.11, 246.12, 137/246.13, 246.14, 246.15, 246.16, 246.17, 246.18, 246.19, 246.2, 246.21, 246.22, 246.23; 251/309, 310, 311, 312, 317

[56] References Cited

U.S. PATENT DOCUMENTS

| 2,653,791 | 9/1953 | Mueller | 137/246.15 |
|---|---|---|---|
| 2,738,799 | 3/1956 | Mueller | 137/246.22 |
| 2,746,478 | 5/1956 | Johnson | 137/246.16 |
| 2,829,667 | 4/1958 | Mueller | 137/246.15 |
| 2,829,668 | 4/1958 | Mueller | 137/246.16 |
| 2,898,081 | 8/1959 | Johnson | 251/309 |
| 3,004,550 | 10/1961 | Poisker | 137/246.15 |
| 3,509,603 | 5/1970 | Lowe et al. | 137/246.15 |
| 3,509,903 | 5/1970 | Lowe et al. | 137/246.15 |

Primary Examiner—George L. Walton
Attorney, Agent, or Firm—Finnegan, Henderson, Farabow, Garrett & Dunner

[57] ABSTRACT

A rotary plug valve has a valve body member provided with a ported plug seat, and a ported plug member rotatably mounted in the valve body member, the plug member being adapted to be rotated between the position where the ports are aligned and the position where the ports are not aligned, thereby opening and closing the valve. One of the valve body member and the plug member is provided in the surface thereof facing the other member with circumferential grooves at both axial end portions of the member. The circumferential grooves receive respective packing "O" rings which form tight seals between the opposing seat surfaces of the valve body member and the plug member. The seat surface of either one of the valve body member and the plug member is provided with a plurality of channels extending in the longitudinal direction of the member at both sides of each port, so as to provide communication between two circumferential grooves. The circumferential grooves and the channels in combination constitute a closed lubrication system of the valve. The bottom wall of each circumferential groove is inclined such that the distance between the bottom wall and the opposing seat surface is greater at the end of the groove adjacent to the central region of the plug member than at the end of the same remote from the central region. With this arrangement, it is possible to store and reserve greater energy for pressurizing the lubricant.

5 Claims, 9 Drawing Figures

ROTARY PLUG VALVE

FIELD OF THE INVENTION

The present invention relates to a rotary plug valve of the type having a valve body member provided with a ported plug seat and a ported plug member rotatable in the seat for opening and closing a fluid passage in the valve. More particularly, the invention is concerned with an improvement in a rotary plug having a closed lubrication system, particularly the rotary plug valve of the type shown in the specification of the U.S. Pat. No. 3,509,903 issued on May 5, 1970.

DESCRIPTION OF THE PRIOR ART

The known rotary plus valve shown in the specification of the U.S. Pat. No. 3,509,903 mentioned before has a plug member which is provided in the outer circumferential surface thereof with circumferential grooves formed at both axial end portions thereof. Packing "O" rings are fitted in these circumferential grooves to form a seal between each axial end portion of the plug member and opposing surface portions of the seat in the valve body member. The plug member is provided with a plurality of axial lubricant channels formed in the outer peripheral surface thereof so as to provide communication between two circumferential grooves in both axial end portions of the plug member. Spaces are preserved in respective circumferential grooves at the radially inner side of the "O" rings. These spaces constitute, in combination with the axial lubricant channels, a closed lubrication system.

To explain in more detail, as shown in FIGS. 7 to 9, the circumferential grooves 132, 134 of this known rotary plug valve have bevelled or chamfered surfaces 145,154 on their inner walls 144,150 so that spaces are left between "O" rings 136,138 around the plug member 112 and the inner walls 144,150 of the circumferential grooves. With this arrangement, it is possible to prevent the "O" rings from blocking the inlet sections of the lubricant channels 156. Consequently, the lubricant can be distributed to the entire circumference of the plug member as shown by arrows "B" in FIG. 8, and the upper and lower "O" rings 136 and 138 can be deformed uniformly as the lubricant is pressurized. Consequently, the energy for pressurizing the lubricant can be fully stored and the volume of the space between each circumferential groove and the "O" ring stored therein is maximized, thus accomplishing the object of the invention of this Patent.

This prior art, however, suffers from the following disadvantage. Namely, since the storage of energy for pressurizing the lubricant is made only through the elastic deformation of the "O" rings 136, 138, so that the stored energy is lost because the pressure of the lubricant is relieved through the port of the valve member as a result of opening and closing operation of the valve. Consequently, the lubrication between the seat in the valve body member and the plug member is gradually impaired. In this known rotary plug valve, therefore, it is necessary to recharge the lubricant to resume the required lubricating condition, after a suitable number or repetitions of the valve opening and closing operation.

Another problem encountered by this known rotary plug valve is that, since the elastic deformation of the "O" ring can accommodate only a limited energy, the lubricant staying in the space between the opposing surfaces of the seat in the valve body member and the plug member may be expelled by the force which is produced by the fluid flowing in the valve, particularly when the fluid pressure is high. Consequently, the seal is progressively impaired to permit a leak of the internal fluid to the outside of the valve.

SUMMARY OF THE INVENTION

Accordingly, it is a primary object of the invention to provide a rotary plug valve, in which the closed lubrication system is improved to prolong the time interval of the recharging of the lubricant and to allow the valve to operate at higher pressure of the internal fluid. Namely, the invention aims at providing a rotary plug valve in which the level of the energy stored by the pressurized lubricant is increased to allow the lubricant between the opposing surfaces of the seat in the valve body member and the plug member to stand a longer use, well resisting to the force produced by the fluid flowing in the valve even when the pressure of the fluid is high.

To this end, according to the invention, there is provided a rotary plug valve including: a valve body member having a through bore constituting a fluid passage and a vertical through bore which crosses the fluid passage at a right angle, the vertical bore presenting a plug seat surface in which the ports of the fluid passage open; a plug member adapted to be received by the vertical bore of the valve body member and having a fluid passage including ports capable of being aligned with the ports in the plug sheet, at least the central portion of the peripheral surface of the plug member having the ports and opposing to the plug sheet presenting a seat surface which can make a sealing contact with the plug sheet; circumferential grooves formed in either one of the seat surfaces of the valve body member and the plug member at both longitudinal end portions so as to sandwich the central region of the one of the valve body member and the plug member; elastically deformable packing "O" rings received in the circumferential grooves so as to be pressed between the bottom walls of the circumferential grooves and the seat surfaces of the other of the valve body member and the plug member thereby to form tight seals therebetween; a plurality of channels formed in the seat surface of either one of the valve body member and the plug member so as to extend longitudinally at both sides of each port of the either one of the valve body member and the plug member in such a manner as to provide communication between the circumferential grooves thereby forming a closed lubrication system; and a means including a passage connected to at least one of the channels and adapted for allowing a lubricant to be charged therethrough into the closed lubrication system; wherein the improvement that the bottom wall of each of the circumferential grooves is so inclined that the distance between the bottom wall and the opposing seat surface is greater at the end of the circumferential groove closer to the central region than at the end of the same remoter from the central region.

The above and other objects, features and advantages of the invention will become clear from the following description of the preferred embodiment taken in conjunction with the accompanying drawings.

DESCRIPTION OF THE PREFERRED EMBODIMENT

Figure 1:
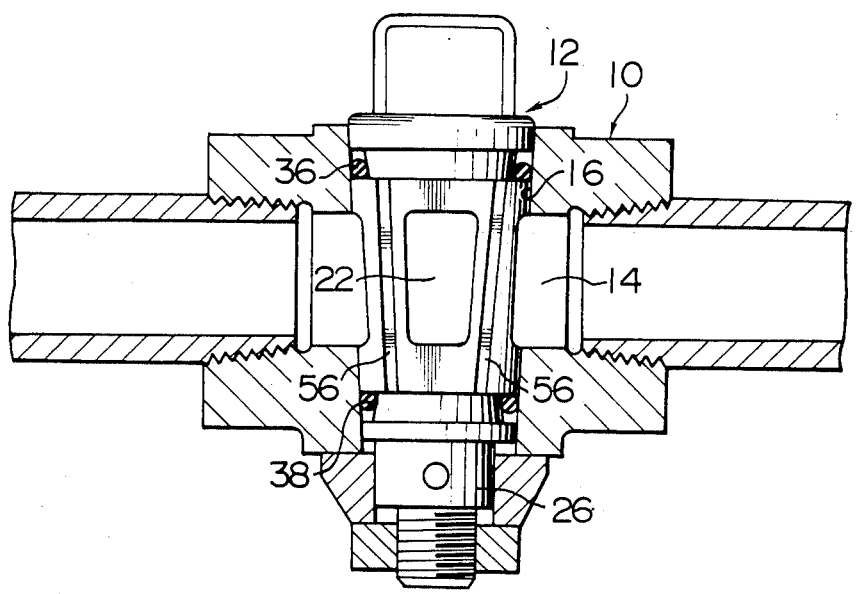
FIG. 1 is a vertical sectional view of an embodiment of the rotary plug valve in accordance with the invention.

Referring to FIG. 1, a rotary plug valve embodying the present invention has a valve body member generally designated by a reference numeral 10, and a plug member generally designated by a reference numeral 12.

The valve body member 10 is provided with an internal bore 14 defining a fluid passage. Both axial end portions of the valve body member are internally threaded for connection to other parts of a pipe line system. Needless to say, the internal threads for connection may be substituted by other equivalent means such as flanges. The valve body member 10 is provided also with a vertical through bore which crosses the internal bore 14 at a right angle thereto. The inner peripheral surface defining the vertical through bore is tapered to constitute a plug seat 16.

Figure 2:
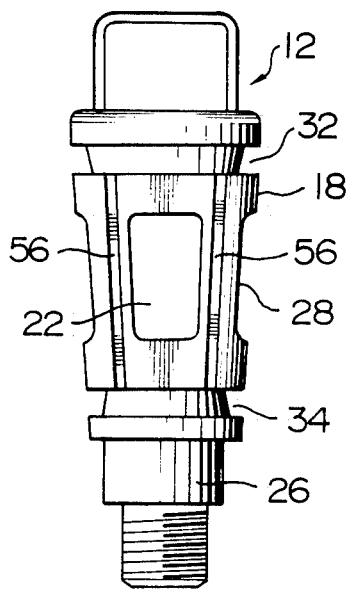
FIG. 2 is a side elevational view of a plug member incorporated in the embodiment shown in FIG. 1.

Referring to FIG. 2, the plug member 12, which is one of the essential parts of the valve of invention, has a tapered outer peripheral surface 18 which can closely fit the seat 16 on the valve body member 10. Thus, the plug member 12 is received in the vertical bore of the valve body member.

Figure 3:
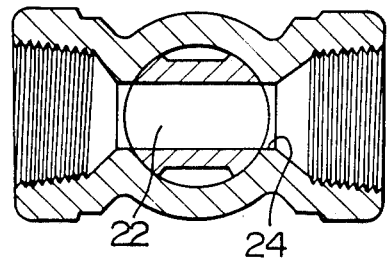
FIG. 3 is a cross-sectional view of the embodiment shown in FIG. 1.

The tapered outer peripheral surface of the plug member 12 extends across the fluid passage formed in the valve body member 10, and is provided with a port 22 which defines a fluid passage therein, as shown in FIG. 3. The port 22 has straight side walls which are made flush with the straight side walls 24 of the fluid passage formed in the valve body member 10, when the plug member 12 is turned to the valve open position.

The plug member 12 is provided at its lower end with a reduced-diameter portion 26 below the tapered major portion thereof. The reduced-diameter portion has a means for rotatably mounting the plug member 12 in the valve body member 10.

The tapered outer peripheral surface of the plug member 12 and the inner surface of the seat 16 of the valve body member are faced up with each other to form suitable seating areas therebetween. As a result, when the plug member 12 is fixed at a suitable seating position on the seat of the valve body member, these surfaces closely contact each other at the above-mentioned seating areas. The opposing contact surfaces of the plug member 12 and the valve body member 10 are exposed to the atomosphere at both ends of the valve assembly. Sealing means including packing "O" rings 36, 38 are provided at both longitudinal end portions of the opposing contact surfaces. The plug member 12 is provided on the tapered surface, i.e., the conical seat surface 18 thereof with blind ports 28 which are recessed in the direction perpendicular to the port 22. The blind port 28 has a configuration substantially same as that of the port 22.

Circumferential grooves 32 and 34 are formed in the seat surface 18 of the plug member 12 opposing the seat surface 16, at both axial end portions of the plug member. These grooves 32 and 34 receive, respectively, endless packing "O" rings 36 and 38 made of an elastically deformable flexible material.

The "O" rings 36 and 38 have a generally circular cross-section of a diameter greater than the dept of the circumferential grooves 32 and 34, so that, when the plug member is mounted in the valve body member 10, the "O" rings 36 and 38 closely contact the bottom surfaces of the grooves 32 and 34 and the opposing seat surface 16 to form effective seals in respective seating areas. Referring to FIGS. 1, 2, 4 and 5, the upper circumferential groove 32 formed in the plug member 12 has a bottom wall 40, upper or outer end wall 42 and a lower or inner end wall 44. The bottom wall 40 is not parallel with the seat surface 16 but is inclined at a certain angle with respect to the seat surface 16. More specifically, the bottom wall 40 diverges radially inwardly and downwardly, so that the depth of the circumferential groove 32 is greater at its lower portion than at its upper portion. The lower circumferential groove 34 has a bottom wall 48, upper or inner end wall 50 and a lower or outer end wall 52 and a bottom wall 48 similar to those of the upper circumferential groove 32. The bottom wall 48 is not parallel to the seat surface 16 so as to diverge radially inwardly and upwardly. Thus, the depth of the circumferential groove 34 is greater at its upper portion than at its lower portion. In each of the circumferential grooves 32 and 34, the distance between the inner wall and the outer wall is greater than the diameter of the "O" rings 36 and 38.

Figure 4:
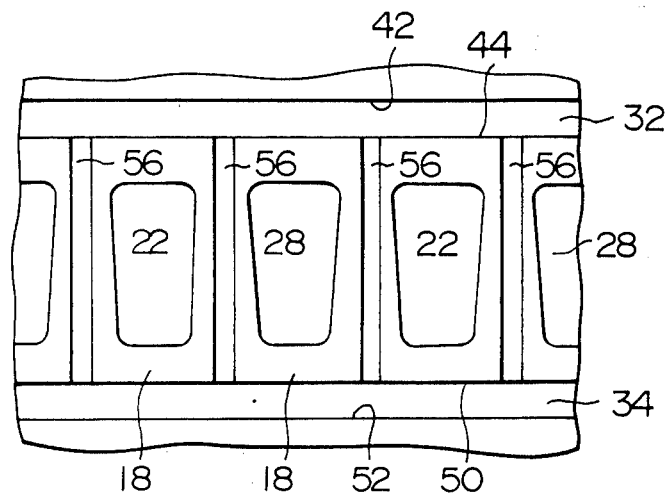
FIG. 4 is a developed view of an essential portion of the plug member.
Figure 5:
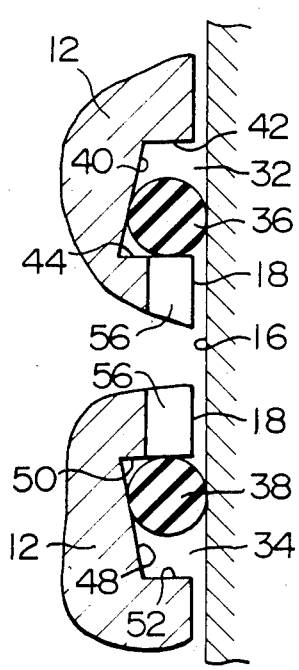
FIG. 5 is a partial enlarged sectional view of the embodiment shown in FIG. 1, with packing "O" rings fitted in the circumferential grooves thereof.

As will be seen from FIGS. 1, 2 and 4, the inner walls 44 and 50 of the circumferential grooves 32 and 34 are connected to each other through four channels 56 constituting the lubricant grooves formed in the outer peripheral surface of the plug member. These channels 56 are equispaced in the circumferential direction and extend in the longitudinal or axial direction of the plug member. In the illustrated embodiment of the invention, the circumferential grooves 32, 34 and the channels 56 are formed in the outer peripheral surface of the plug member 12. This arrangement, however, is not exclusive and these grooves and channels may be formed in the inner peripheral surface, i.e., the seat surface, of the valve body member 10. It is also possible to form only the channels 56 in the seat surface 16 of the valve body member 10, while forming the circumferential grooves 32 and 34 in the seat surface of the plug member 12.

Figure 6:
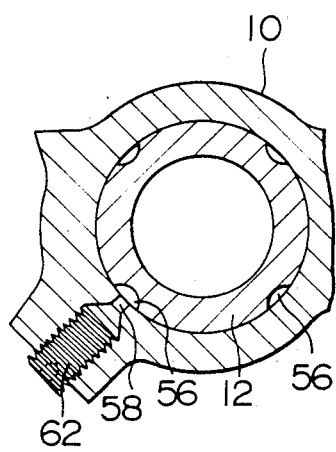
FIG. 6 is a partial enlarged cross-sectional view of a lubricant supply means for supplying a lubricant to a closed lubrication system incorporated in the embodiment shown in FIG. 1.
Figure 7:
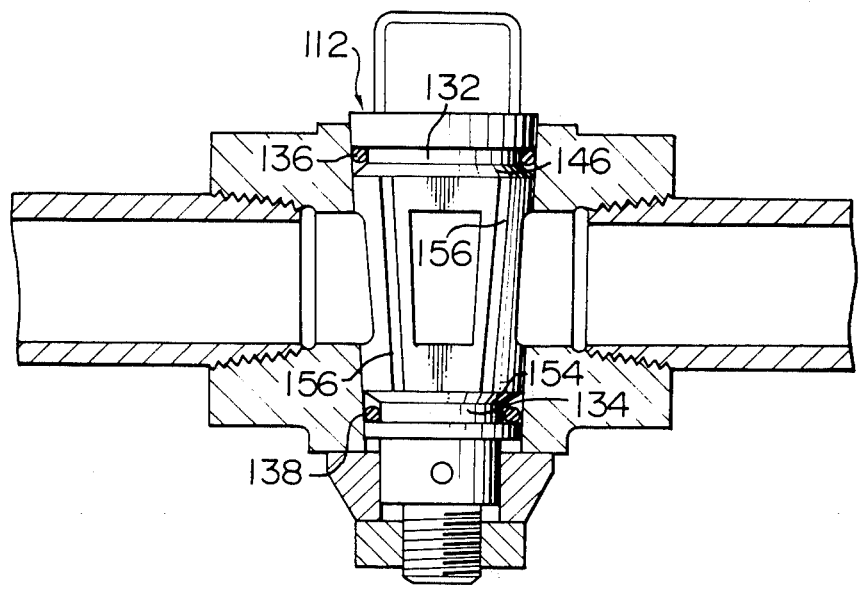
FIG. 7 is a vertical sectional view of a known rotary plug valve.
Figure 8:
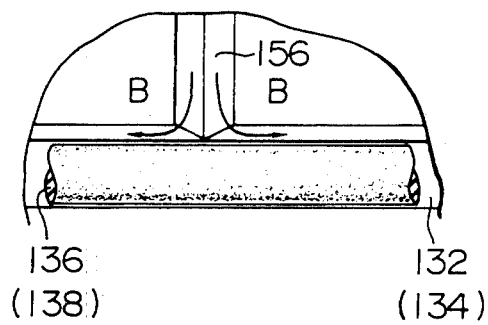
FIG. 8 is an enlarged view showing the connection between a lubricant channel and a circumferential groove in the known rotary plug valve.
Figure 9:
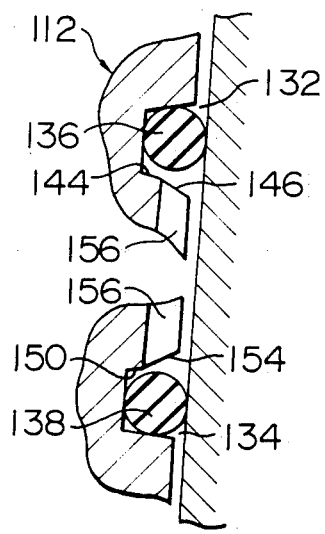
FIG. 9 is a partial enlarged sectional view of a known rotary plug valve having packing "O" rings fitted in circumferential grooves thereof.

The channels 56 have a depth which is smaller than the depth of the circumferential grooves 32 and 34. The channels 56 cooperate with the portions of the circumferential grooves unoccupied by the "O" rings in forming a closed lubrication system which perfectly encloses the opposing ends of the port 22 in the plug member 12 and the openings of the fluid passage 14 in the seat surface of the valve body member 10. A lubricant charging port 58 (see FIG. 6) is formed across the thickness of the wall of the valve body member 10. For charging the closed lubrication system with the lubricant, the lubricant is supplied through this charging port 58. The charging port 58 is disposed so as to communicate with one of the channels 56 when the plug member takes either the valve-open position of the valve-close position. The charging port 58 is provided at its outer end with an internal screw thread for screwing engagement with a charging plug 62. For charging the lubricant, the plug 62 is detached to permit the injection of the lubricant into the port 58. The lubricant, which generally has a comparatively high viscosity, is charged into the channel 56 communicating with the port 58 and flows vertically along the channel 56 to fill the circumferential grooves 32 and 34.

At stated before, the circumferential grooves 32 and 34 have a width which is greater than the diameter of the "0" rings, and the bottom walls 40 and 48 of the circumferential grooves 32 and 34 are so inclined that distance between the bottom wall of each groove and the seat surface 16 is progressively increased toward the central region of the valve. Consequently, when the channel 56 communicating with the charging port 58 is filled up with the lubricant, the pressurized lubricant flows around the space which is perfectly enclosed by the "O" rings 36 and 38 and then flow into other channels 56 which do not communicate with the charging port 56. After completely filling up the closed lubrication system, the plug 62 is fitted to the charging port 58. The plug 62 serves as a piston to additionally pressurize the lubricant the closed lubrication system. Consequently, the packing "O" rings are biased outwardly into contact with the outer walls 42 and 52 of respective circumferential grooves 32 and 34 and, at the same time, compressed by the pressure of the lubricant. As a result of this biasing and compressing action, the packing "O" rings 36 and 38 are deformed elastically to absorb and store the pressure energy posessed by the lubricant.

In this regard, it is to be noted that the packing "O" rings in the rotary plug valve of the invention can store greater energy than the packing "O" rings employed by the known rotary plug valve in which the storage of energy relies solely upon the elastic deformation of the packing "O" rings. Namely, in the rotary plug valve of the invention, since the bottom walls 40 and 48 of respective circumferential grooves diverge radially inwardly towards the axially central portion of the plug member 12, the packing "0" rings 36 and 38 radially stretched and held in contact with the outer walls 42 and 52 of the circumferential grooves 32 and 34 naturally tend to contract radially to move back toward the inner walls 44 and 50 of respective circumferential grooves 32 and 34. This tendency of radial contraction and the consequent movement of the packing "O" rings toward the inner walls of respective grooves produces a force which acts to pressurize the lubricant. Thus, in the rotary plug valve of the invention, the packing "O" rings 36 and 38 are stretched radially outwardly and compressed elastically to exert a force which is the sum of the axially inward force produced by the radially contracting tendency of these "O" rings and the force produced by the resetting of the "O" rings from the elastically deformed condition. Consequently, in the rotary plug valve of the invention, it is possible to store greater energy for pressurizing the lubricant, as compared with the known rotary plug valve in which the energy is stored by the elastic deformation of the "O" rings solely.

In operation, the tendency of movement of the packing "O" rings towards the inner walls of respective circumferential grooves, in addition to the tendency of recovering of these packing "O" rings from the elastically deformed state, acts to apply a constant pressure to the lubricant, so that the lubricant is pressed into the spaces between opposing seat surfaces in respective seating areas thereby lubricating these surfaces.

As will be understood from the foregoing description, according to the invention, it is possible to reserve a higher lubricant pressure and, hence, the greater energy than in the known rotary plug valve. Consequently, it becomes possible to maintain an effective seal overcoming the force produced by the pressure of the fluid flowing in the valve, even when the fluid pressure is high. Furthermore, it is to be noted that a higher tightness of the seal can be produced even with a reduced precision of the seat surfaces in the valve body member and the plug member. Furthermore, it is to be understood that these remarkable effects can be maintained for a longer period of time than in the known rotary plug valve, because the rotary plug valve of the invention can store aand reserve greater energy than the known one. Consequently, the frequency of required recharging of the lubricant is reduced without impairing the function of the valve, and the valve can stand a long use while keeping a high sealing effect.

Although the invention has been described through specific terms, it is to be noted that the described embodiment is not exclusive and various changes and modifications may be imparted thereto without departing from the scope of the invention which is limited solely by the appended claims.

What is claimed is:

1. In a rotary plug valve including: a valve body member having a through bore constituting a fluid passage and a vertical through bore which crosses the fluid passage at a right angle, said vertical bore being formed with a plug seat surface in which the ports of said fluid passage open; a plug member adapted to be received by said vertical bore of said valve body member and having a fluid passage including ports capable of being aligned with the ports in said plug seat, the peripheral surface of said plug member opposing said plug seat being formed with at least its central portion including said ports having a seat surface which can make a sealing contact with said plug seat; circumferential grooves formed in either one of the seat surfaces of said valve body member and said plug member at both longitudinal end portions so as to sandwich the central region of said one of said valve body member and said plug member, each of said circumferential grooves having a bottom wall and opposing end walls; elastically deformable packing "O" rings received in said circumferential grooves so as to be pressed between the bottom walls of said circumferential grooves and the seat surface of the other of said valve body member and said plug member thereby to form tight seals therebetween; a plurality of channels formed in the seat surface of either one of said valve body member and said plug member so as to extend longitudinally at both sides of each port of said either one of said valve body member and said plug member in such a manner as to provide communication between said circumferential grooves thereby forming a closed lubrication system; and means including a passage connected to at least one of said channels and adapted for allowing a lubricant to be charged therethrough into said closed lubrication system; wherein the improvement comprises that said bottom wall of each of said circumferential grooves is inclined toward said central region relative to said opposing seat surface so that the distance between said bottom wall and the opposing seat surface is greater at the end of said circumferential groove proximate said central region than at the end of said circumferential groove distant said central region, whereby during charging of the valve with lubricant, the "O" rings are caused to deform elastically by being wedged into the portions of the respective grooves distant said central region thereby providing a more effective seal and storing pressure energy therein.

2. The rotary plug valve according to claim 1, wherein said circumferential grooves and said channels are formed in the peripheral surface of said plug member.

3. The rotary plug valve according to claim 2, wherein said plug member is provided with four channels spaced equally in the circumferential direction.

4. The rotary plug valve according to claim 1, wherein each of said circumferential grooves has a breadth between both end walls thereof greater than the diameter of cross section of said packing "O" ring and a radial depth smaller than said diameter of cross section of said packing "O" ring, each of said channels having a depth smaller than the maximum depth of said circumferential groove.

5. The rotary plug valve according to claim 1, wherein the seat surfaces of said valve body member and said plug member are tapered.

* * * * *